J. BARRANS.
Traction-Wheel.
No. 26.074.
3 Sheets—Sheet 2.
Patented Nov 8, 1859.
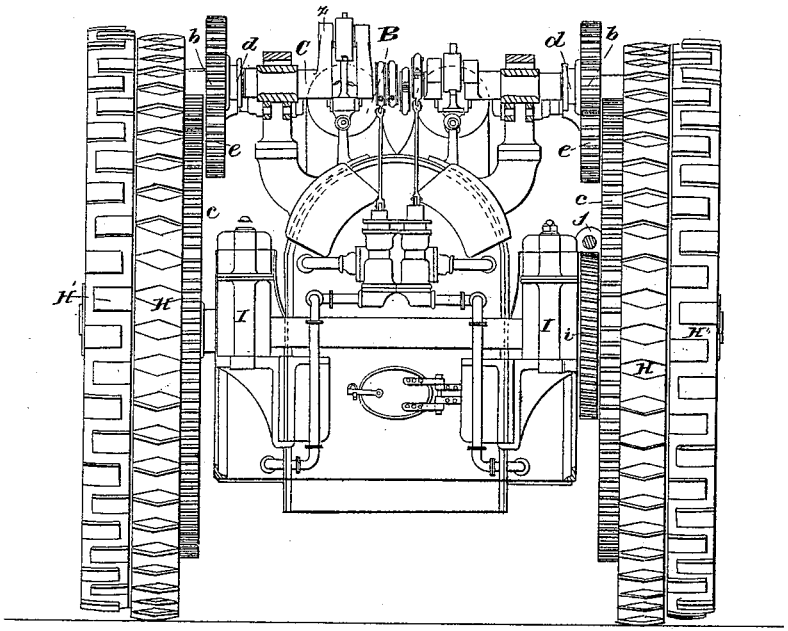
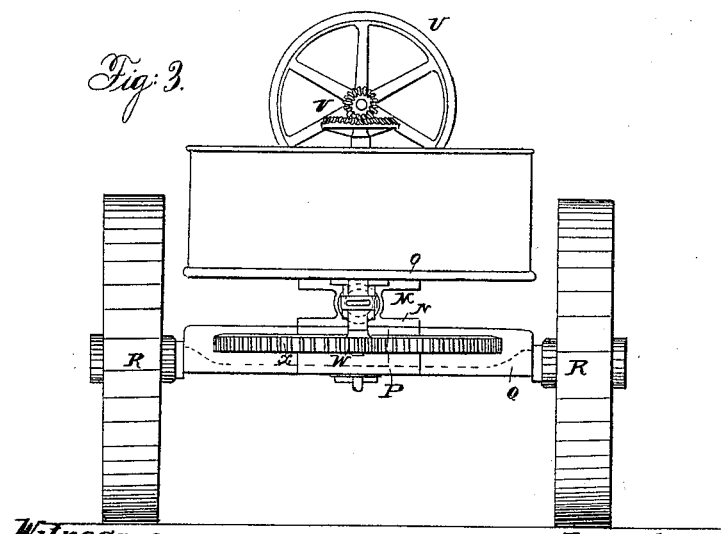
Witnesses.
Inventor.

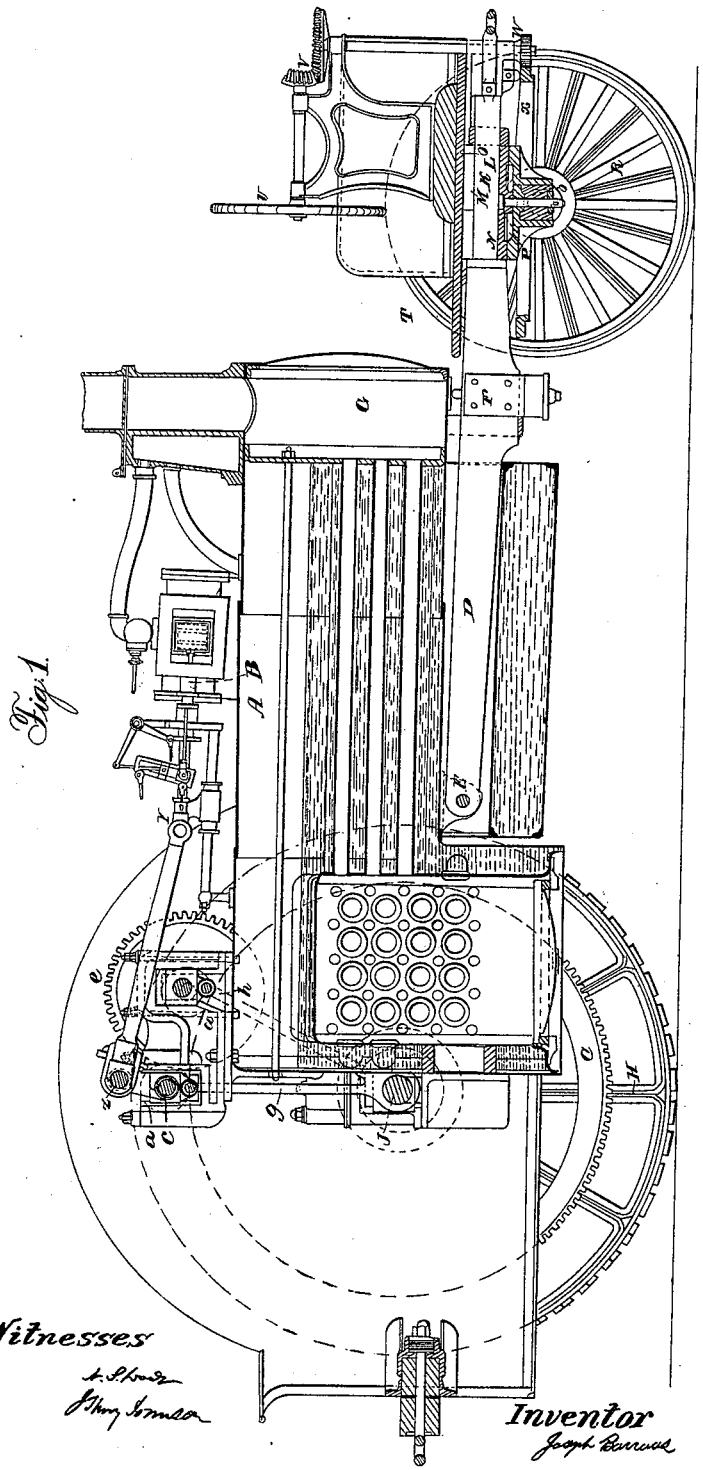

J. BARRANS.
Traction-Wheel.
No. 26,074.
3 Sheets—Sheet 3.
Patented Nov 8, 1859.
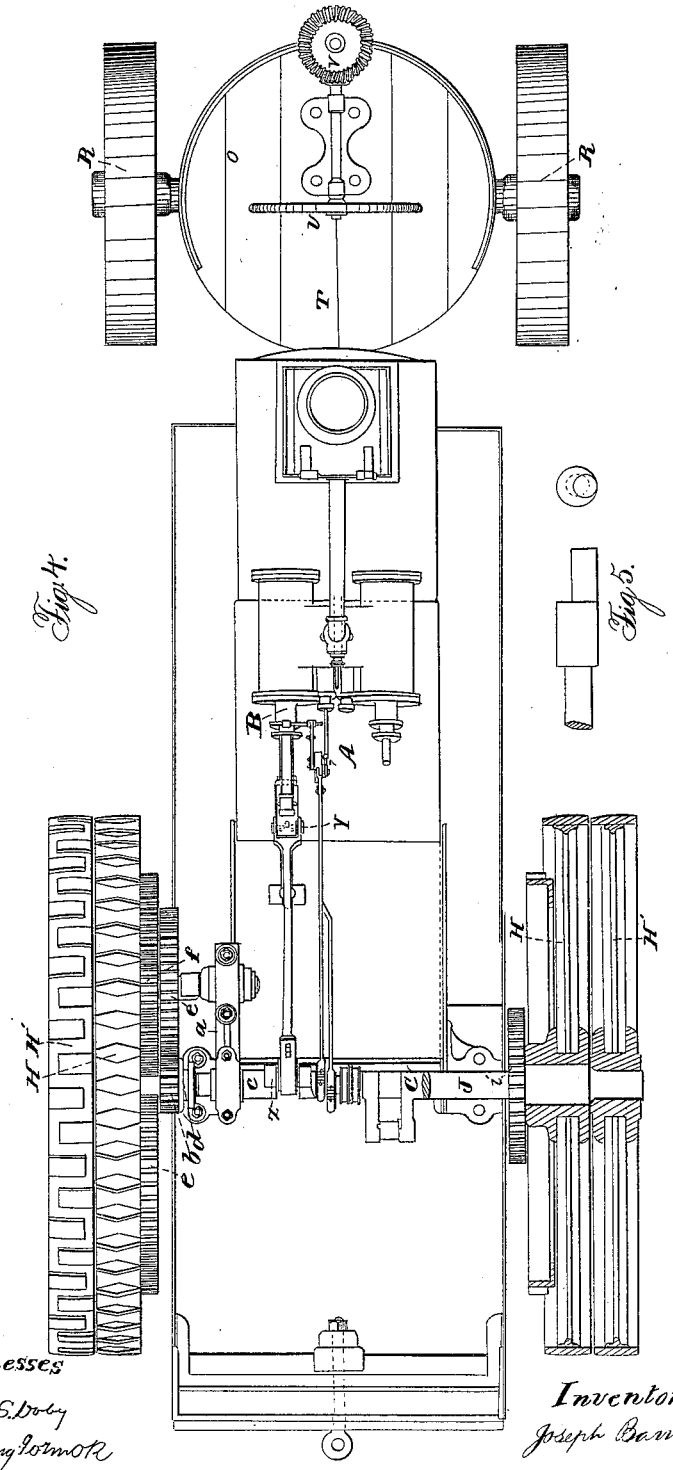
Witnesses
Inventor
Joseph Barrans

UNITED STATES PATENT OFFICE.

JOSEPH BARRANS, OF PECKHAM, ENGLAND.

PORTABLE TRACTION-LOCOMOTIVE.

Specification of Letters Patent No. 26,074, dated November 8, 1859.

*To all whom it may concern:*

Be it known that I, JOSEPH BARRANS, of 2 Caledonian Terrace, Queens Road, Peckham, in the county of Surrey, England, engineer, have invented an Improved Traction-Engine; and that the following is a full, clear, and exact description of the principle or character which distinguishes it from all other things before known and of the usual manner of making, modifying, and using the same, reference being had to the drawings hereunto annexed and to the letters and figures marked thereon—that is to say:

This invention has for its object improvements in traction and portable steam engines as suited for various uses. For these purposes in constructing such kinds of engines in order to support the weight of the boiler and the steam cylinder or cylinders a beam or lever is applied at the under part thereof, the hinder end of this beam or lever moves on an axis the bearings of which are fixed to the boiler. The beam or lever carries a box or apparatus for receiving a vulcanized india rubber spring or a spring of other suitable material and the smoke box end of the boiler rests on, and is supported by, the spring.

The fire box end of the boiler is carried by the axle of the hinder or driving wheels there being vulcanized india rubber or other suitable springs interposed between the axle and the bearing parts of the boiler. The fore end of the lever beam is formed into an axle on which the fore carriage and locking motion are arranged to turn so as to admit of the fore axle inclining to the one side or to the other as regards the horizontal line in the event of passing over an uneven surface thus either front wheel may rise without interfering with the due horizontal level of the engine framing. The driving wheels are driven by spur pinions gearing into cog wheels fixed to the driving wheels and by preference there are two sizes of pinions used, so as to give at different times different speeds of driving, and when such is the case it is preferred to have the cog wheels which are fixed to the driving wheels cogged on their inner and outer surfaces and in order to keep the axle of the driving wheels and the axes of the pinions correctly distanced they are connected by suitable links or framing and the two pinions which drive either of the cog wheels are arranged in such manner that when the slow speed is desired, the pinion on the axis which receives its motion from the engine, slides on its axis out of gear with its cog wheel into gear with an intermediate wheel which is on the axis of the other pinion and the axis of such pinion is moved into and out of position by an eccentric or otherwise.

In constructing the driving wheels, each wheel consists of two or more parts or rings which are so arranged that all may press on the ground and act as one wide ring thereon or only one or more of the parts or rings of which a wheel is composed may bear on the ground and one or more of the rings are made plain on their peripheries while another or others is made with fixed teeth or transverse projections to give them a more secure holding preferring that such teeth or projections shall not go from side to side of a wheel or extend right across the wheel face but only partly so and that they shall alternate. The fore wheels may also each be composed of two or more parts or rings. And in order that the said invention may be properly understood I shall now proceed to describe certain modifications under which it may be judiciously carried out in practice reference being had to the sheet of drawings hereunto attached—that is to say:

Figure 1 of the drawings represents a vertical longitudinal section of a portable or traction engine as made according to the present invention. Fig. 2 is a corresponding end detailed view of the engine crank shaft and its coupling and ground driving gear for one side. Fig. 3 represents a front end view partially in transverse section of the universal steering apparatus with its pair of front wheels and Fig. 4 is a general plan of the engine corresponding to Fig. 1.

The engine and boiler are in themselves arranged and constructed in the ordinary manner of portable or agricultural engines, but the fire box is fitted up according to what is known as "Barrans cup surface" system. The top of the barrel of the tubular boiler A, forms the base for carrying the direct acting horizontal engine B the connecting rod being coupled directly to the transverse crank shaft C carried in bearings on the top of the fire box, at the hind end of the engine.

At D, is a long horizontal beam or lever, jointed at E to the bottom of the barrel of the boiler. This beam or lever is disposed directly beneath the longitudinal axis of the boiler's barrel, and it carries at F a deep box containing vulcanized caoutchouc or other elastic material, or instead of this, a spring of any other convenient kind may be attached here to the beam or lever. The top cover or center pressure receiving pin of this spring is set directly under the smoke box G of the engine so as to bear the entire weight of the front end of the boiler and its appurtenances at that part. With this arrangement the front end of the engine is well supported upon a single elastic center of great simplicity and effect. The hind or fire box end of the boiler, with its appurtenances is carried by another arrangement of vulcanized caoutchouc or other springs, upon the axle of the large ground or driving wheels H, H¹. The spring boxes are at I, one on each side of the fire box, being bolted to bearing brackets which are fitted to the end of the fire box. The axle J of the main wheels, has its bearing interposed between the elastic material and the bearing bracket, so that the whole weight of the fire box end of the boiler rests upon a pair of elastic cushions.

The front end of the main beam or lever D is formed into an axle at K and this axle carries the fore carriage and locking motion. On this axle K, there is fitted a cast iron carriage bearing piece L, bored to fit the axle, and having upper and lower expanded bearing plates M, N. On the upper one there rests the platform O of the steersman's seat while the lower one bears upon the upper face of a bracket P set upon the center of the wooden portion Q of the front axle on which are the two front wheels R. The bearing piece L, has a headed bolt inserted down into it, from the upper side and passed down transversely through the bracket P on the axle, and through the axle itself being cottered below. This forms the dead center on which the fore carriage turns, the fore carriage itself being formed by the combination of the carriage bearing piece L, and the axle bracket P. In this way while the front wheels have a perfect fore carriage and locking action, so as to turn with facility, to the right or left the axle Q, can incline in either direction, when either of the wheels R goes over an obstacle the attachment of the fore carriage to the longitudinal axle K of the beam D giving it perfect freedom to do this. The steersman's position is at T, where he is immediately behind a steering wheel U the spindle of which works a bevel pinion arrangement V. These bevel pinions work a vertical spindle, on the lower end of which, is a spur pinion W in gear with a spur segment on the bottom fore carriage disk X. In the actual driving movements of this engine the connecting rod passes direct from the end of the piston rod at Y to the crank Z on the main horizontal first motion shaft C which runs in the after bearings in the duplex brackets a, bolted to the top of the fire box. On each end of this shaft is a spur pinion b, in gear with a large spur wheel c bolted or otherwise attached to the inner side of the large ground driving wheel. In this way a powerful tractive pull is given to the wheels H in a very simple way. If a still more powerful action is required a slower train is put in gear by means of a clutch on the main crank shaft at d. By this contrivance the pinion b is put out of gear with the large wheel c and into gear with an intermediate spur wheel e on a cross shaft running in the front bearings of the brackets a on the fire box. This shaft also carries a spur pinion f which again gears with the large spur wheel c already referred to. In this way the engine attendant can change from one speed of the train to another with great ease and thus accommodate the engine to suit the positive requirements from it.

The connecting links g, h, show how the respective axes of the ground driving wheels and their actuating pinions and wheels in the driving train, are retained accurately at their proper distances asunder. These two tension links have eyes at their lower ends entered upon the axle of the ground driving wheels, while their other ends are jointed by studs to the lower ends of the brasses of the wheel train bearings above. In this way all the axes move together as in a solid frame. There are two separate ground driving wheels on each side of the engine as marked H, H¹, in my drawings. Those marked H are alone in work as the engine is here represented, but when a greater adhesive power is wanted the other wheels or sections of wheels H¹ are brought into working trim. This adjustment may be effected in various ways—all that is necessary for the purpose, being the bringing down the two sections H¹ so as to bear upon the ground and work as single broad wheels, in combination with the wheels or sections H. The separate detail Fig. 5 on my sheet of drawings shows one mode of effecting this adjustment. Instead of setting the outer section H¹ of the wheel fast upon the axle J, it is set upon an eccentric upon the axle. This eccentric has attached to it, a worm wheel i in which is geared a worm j, the spindle of which can be turned by a handle for that purpose. So long as the eccentricity of the eccentric carriers of the sections H¹ is set upward, these sections will be clear of the ground—as represented in Fig. 2 of the drawings. But when a greater tractive breadth of wheel face is wanted, the eccentric is turned around to bring the sections H¹ down to bear on the ground. In this way any required number of wheel sections may be worked and disengaged as may be found necessary.

The teeth or ground holding projections upon the wheel sections H, H¹ may be of various forms. In the sections H they are represented with angular or double inclined sides, being narrowest at their centers. This form affords a very superior hold upon the ground. In the other sections each tooth is a plain rectangular block, extending not quite across the wheel face, and alternated as regards the blank and solid portions, all around the wheel.

Having now described or ascertained the nature of my said invention and the manner in which the same is or may be used or carried into effect I would observe in conclusion that what I consider to be novel and original and therefore claim as my invention is:—

1. The method herein described of supporting the front portions of traction or portable steam engines, by means of a spring or elasticated beam or lever, at or near the middle thereof, the said beam or lever being arranged constantly to occupy a position in a vertical plane passing through the axis of the boiler, by having its rear and front ends applied and jointed respectively to the bottom of the barrel of the boiler and to the fore carriage substantially in the manner and for the purposes herein set forth.

2. The application and use, in traction and portable steam engines of tensional rods or bars for retaining the driving wheel train centers at the proper distance asunder from the axis of the ground driving wheels.

3. The application and use, in traction and portable steam engines of ground driving wheels in two or more sections, capable of being put into and out of working action for the purpose hereinbefore described and such wheels having teeth or holding projections upon their peripheries of the form and arrangement hereinbefore described.

In testimony whereof I have signed my name to this specification before two subscribing witnesses.

JOSEPH BARRANS.

Witnesses:
A. S. LODGE,
J. HENRY JOHNSON.